United States Patent
Hsia et al.

(10) Patent No.: US 10,635,741 B2
(45) Date of Patent: Apr. 28, 2020

(54) METHOD AND SYSTEM FOR ANALYZING PROCESS FACTORS AFFECTING TREND OF CONTINUOUS PROCESS

(71) Applicant: INDUSTRIAL TECHNOLOGY RESEARCH INSTITUTE, Hsinchu (TW)

(72) Inventors: Chi-Chun Hsia, Kaohsiung (TW); Jun-Bin Yeh, Kaohsiung (TW); Li-Jie Chen, Tainan (TW); Ya-Chu Chuang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 343 days.

(21) Appl. No.: 15/685,483

(22) Filed: Aug. 24, 2017

(65) Prior Publication Data

US 2018/0143943 A1 May 24, 2018

Related U.S. Application Data

(60) Provisional application No. 62/425,632, filed on Nov. 23, 2016.

(30) Foreign Application Priority Data

Jan. 5, 2017 (TW) .............................. 106100302 A

(51) Int. Cl.
*G06F 17/18* (2006.01)
*G06N 20/00* (2019.01)

(52) U.S. Cl.
CPC .............. *G06F 17/18* (2013.01); *G06N 20/00* (2019.01)

(58) Field of Classification Search
CPC ...... G06F 17/18; G06N 20/00; G05B 23/0221
See application file for complete search history.

(56) References Cited

U.S. PATENT DOCUMENTS

| 7,039,554 B2 | 5/2006 | Nguyen et al. |
| 7,349,753 B2 | 3/2008 | Paik |
| 2003/0083824 A1* | 5/2003 | Cawse ................ B01J 19/0046 702/22 |
| 2009/0292386 A1 | 11/2009 | Cheng et al. |
| 2014/0012569 A1 | 1/2014 | Sung et al. |

FOREIGN PATENT DOCUMENTS

| CN | 102032443 A | 4/2011 |
| CN | 102184453 A | 9/2011 |

(Continued)

OTHER PUBLICATIONS

Cherkassky et al. "Prediction of Electric Power Consumption for Commercial Buildings", Proceedings of International Joint Conference on Neural Networks, San Jose, California, USA, Jul. 31-Aug. 5, 2011, pp. 666-672.

(Continued)

*Primary Examiner* — Manuel L Barbee
(74) *Attorney, Agent, or Firm* — Birch, Stewart, Kolasch & Birch, LLP

(57) ABSTRACT

A method and a system for analyzing a plurality of process factors affecting the trend of a continuous process are provided. The method includes the following steps: A plurality of similar time periods are selected from a time series. The trend of the continuous process in each of the similar time periods is similar to the trend of the continuous process in a current time period. A contribution of each of the process factors corresponding a monitoring target is analyzed according to the process factor values in the similar time periods and a plurality of monitor target values of the monitoring target. Part of the process factors are picked out according to the contributions.

22 Claims, 6 Drawing Sheets

(56) References Cited

FOREIGN PATENT DOCUMENTS

| CN | 101109952 B | 3/2012 |
|---|---|---|
| CN | 102109837 B | 3/2014 |
| CN | 104215591 A | 12/2014 |
| TW | M356944 U | 5/2009 |
| TW | 201135612 A1 | 10/2011 |
| TW | 201324431 A1 | 6/2013 |
| TW | I411194 B | 10/2013 |
| TW | 201600981 A | 1/2016 |
| TW | I549007 B | 9/2016 |

OTHER PUBLICATIONS

Choi et al. "Profiling, Prediction, and Capping of Power Consumption in Consolidated Environments*", 2008, pp. 1-10.

Hongyu Guo, "Accelerated Continuous Conditional Random Fields For Load Forecasting", IEEE Transactions on Knowledge and Data Engineering, vol. 27, No. 8, Aug. 2015, pp. 2023-2033.

Milojković et al., "Dynamic One Step Ahead Prediction of Electricity Loads at Suburban Level", 2011 IEEE First International Workshop on Smart Grid Modeling and Simulation (SGMS)—at IEEE SmartGridComm 2011, pp. 25-30.

Shen et al. "Research of annual electricity demand forecasting based on Kernel Partial Least Squares Regression", IEEE Computer Society, 2012 International Conference on Control Engineering and Communication Technology, 2012, pp. 601-604.

Sun et al. "Power Consumption Prediction of Submerged Arc Furnace Based on Multi-Input Layer Wavelet Neural Network", National Technology Support Project, 2010, pp. 1-4.

Taiwanese Office Action and Search Report issued in Taiwanese Application No. 106100302 dated Oct. 25, 2017.

\* cited by examiner

METHOD AND SYSTEM FOR ANALYZING PROCESS FACTORS AFFECTING TREND OF CONTINUOUS PROCESS

This application claims the benefit of Provisional U.S. application Ser. No. 62/425,632, filed Nov. 23, 2016, and Taiwan application Serial No. 106100302, filed Jan. 5, 2017, the disclosure of which is incorporated by reference herein in its entirety.

TECHNICAL FIELD

The disclosure relates in general to a method and a system for analyzing a plurality of process factors affecting a trend of a continuous process.

BACKGROUND

In a continuous process, a monitoring target may be predicted frequently. When an exception occurs on the monitoring target, a plurality of process factors may be needed to be adjusted, so that the operation of the continuous process can be kept running without suddenly stop.

It is important to improve the accuracy of prediction of the monitoring target. Besides, how to adjust the process factors is also a big issue. In one case, the operation of the continuous process may not be kept running if the user/machine/system does not know which process factors needed to be adjusted.

SUMMARY

The disclosure is directed to a method and a system for analyzing a plurality of process factors affecting a trend of a continuous process.

According to one embodiment, a method for analyzing a plurality of process factors affecting a trend of a continuous process. The method for analyzing the process factor includes the following steps: A plurality of process factor values of each of the process factors are captured along with a time series and a plurality of monitoring target values of a monitoring target are captured along with the time series. A plurality of similar time periods are selected from the time series. The trend of the continuous process in each of the similar time periods is similar to the trend of the continuous process in a current time period. A contribution of each of the process factors corresponding the monitoring target is analyzed according to the process factor values in the similar time periods and the monitor target values of the monitoring target. Part of the process factors is picked out according to the contributions.

According to another embodiment, a system for analyzing a plurality of process factors affecting a trend of a continuous process is provided. The system for analyzing the process factors includes a process database, a monitoring database, a capturing unit, a selecting unit, an analyzing unit and a picking unit. The process database is for storing a plurality of process factor values of each of the process factors along with a time series. The monitoring database is for storing a storing a plurality monitoring target values along with the time series. The capturing unit is for capturing the process factor values and the monitoring target values. The selecting unit is for selecting a plurality of similar time periods from the time series. The trend of the continuous process in each of the similar time periods is similar to the trend of the continuous process in a current time period. The analyzing unit is for analyzing a contribution of each of the process factors corresponding the monitoring target according to the process factor values in the similar time periods and the monitor target values of the monitoring target. The picking unit is for picking out part of the process factors according to the contributions.

Figure 1:
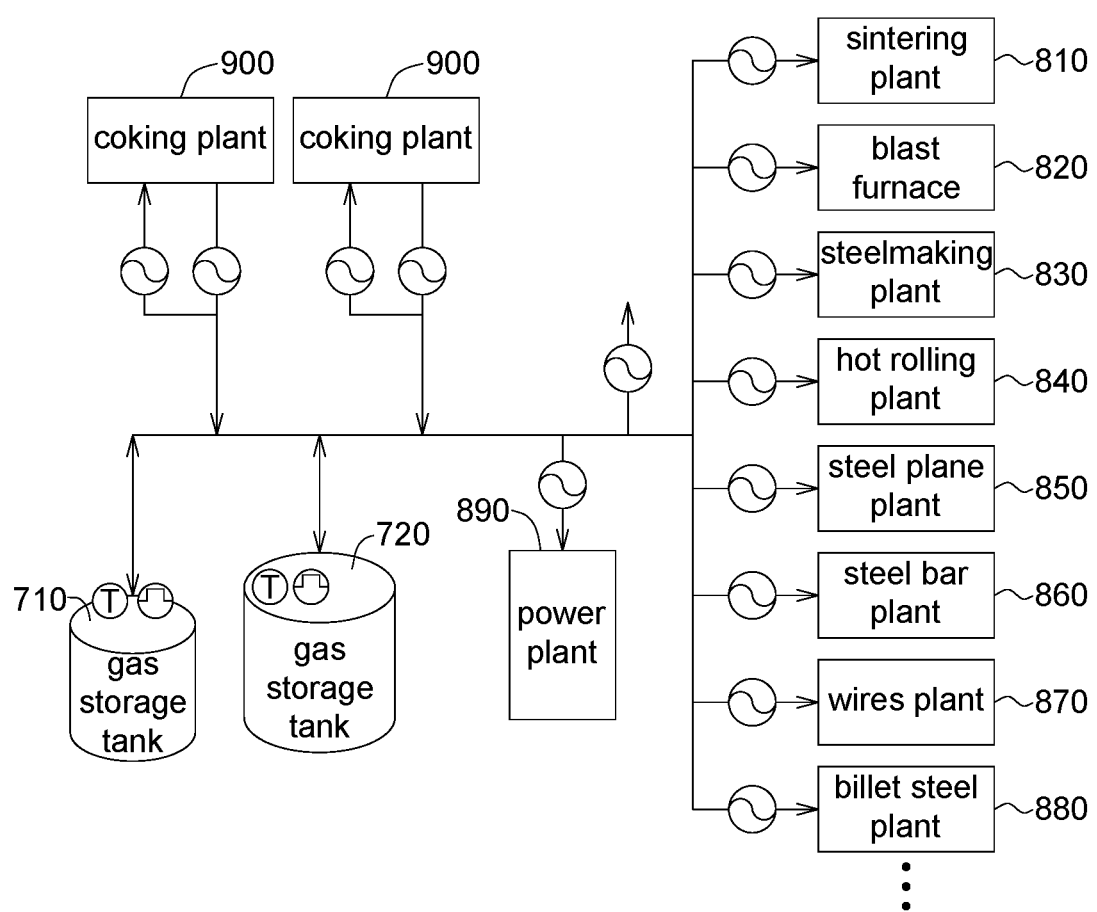
FIG. 1 shows a continuous process plant.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a continuous process plant. For example, the continuous process plant may be a coking plant 900. The oven gas generated from the coking plant 900 can be provided to the sintering plant 810, the blast furnace 820, the steelmaking plant 830, the hot rolling plant 840, the steel plane plant 850, the steel bar plant 860, the wires plant 870, the billet steel plant 880 or the power plant 890. For controlling the amount of the oven gas, the oven gas can be stored in the gas storage tanks 710, 720. The liquid level of the gas storage tanks 710, 720 is changed and affected by the producing end, such as the coking plant 900, and the consuming end, such as the sintering plant 810, the blast furnace 820, the steelmaking plant 830, the hot rolling plant 840, the steel plane plant 850, the steel bar plant 860, the wires plant 870, the billet steel plant 880 and/or the power plant 890. In the present embodiment, the liquid level of the gas storage tank 710 (or the gas storage tank 720) is a monitoring target, the producing end, such as the coking plant 900 and the consuming end, such as the sintering plant 810, the blast furnace 820, the steelmaking plant 830, the hot rolling plant 840, the steel plane plant 850, the steel bar plant 860, the wires plant 870, the billet steel plant 880 and/or the power plant 890, are process factors.

In the present embodiment, part of the process factors which significantly affect the monitoring target, such as the liquid level, are detected under an allowed forecast accuracy. For example, the part of the process factors which significant affect the monitoring target may be some of the coking plant 900, the sintering plant 810, the blast furnace 820, the steelmaking plant 830, the hot rolling plant 840, the steel plane plant 850, the steel bar plant 860, the wires plant 870, the billet steel plant 880 and/or the power plant 890.

In the present embodiment, a plurality of similar time periods, whose trends are similar to the trend of the current time period, are selected to be the training data by the local modeling technology. Part of the process factors with time delay which significantly affect the monitoring target are picked out. A prediction curve obtained according to those part of the process factors is similar to a curve of the monitor target. Thus, those part of the process factors can be used to predict the trend of the monitoring target.

Figure 2:
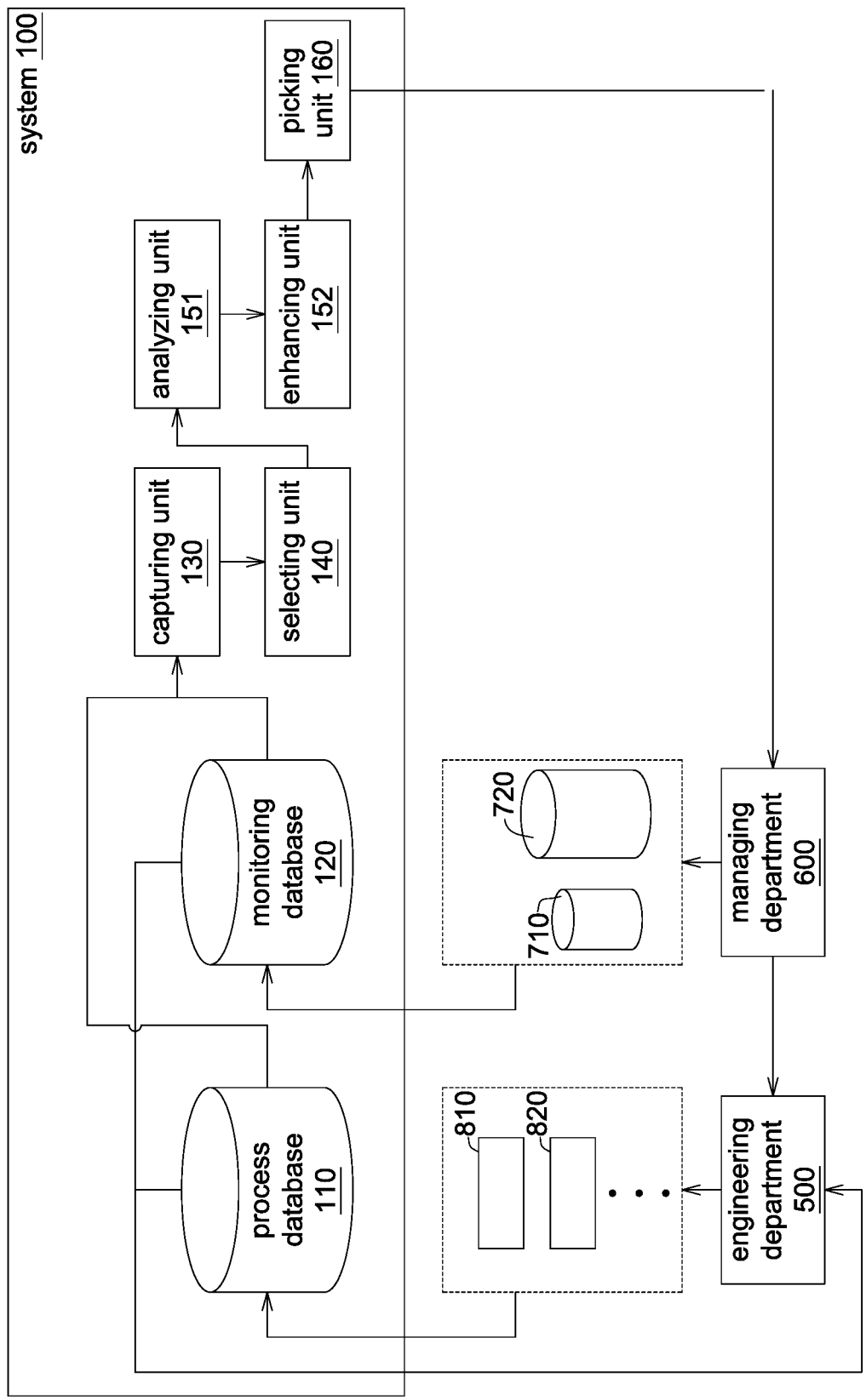
FIG. 2 shows a system for analyzing the process factors affecting the trend of the continuous process.

Please refer to FIG. 2, which shows a system 100 for analyzing the process factors affecting the trend of the continuous process. In the continuous process plant, the monitor target is affected by the process factors, such that the monitoring target value is changed accordingly. Taken the coking plant 900 as an example, the monitor target is the liquid level of the gas storage tank 710 (or the gas storage tank 720). The liquid level can be the value measured by, for example, a liquid meter, a digital sensor or a measuring equipment. The process factors may be the value of the producing end, such as the coking plant 900, and the consuming end, such as the sintering plant 810, the blast furnace 820, the steelmaking plant 830, the hot rolling plant 840, the steel plane plant 850, the steel bar plant 860, the wires plant 870, the billet steel plant 880 and/or the power plant 890, measured by any digital sensor or measuring equipment. In the past, the monitor target is monitored by human. When an exception occurs on the monitoring target, which process factors needed to be adjusted are analyzed by the power engineer, and those process factors are adjusted by the operating engineer.

As shown in FIG. 2, the system 100 for analyzing the process factors includes a process database 110, a monitoring database 120, a capturing unit 130, a selecting unit 140, an analyzing unit 151, an enhancing unit 152 and a picking unit 160. The process database 110 is used for storing a plurality of process factor values of each of the process factors along with a time series. The monitoring database 120 is used for storing a plurality monitoring target values of a monitoring target along with the time series. According to the present embodiment, the similar time periods, whose trends are similar to the trend of the current time period, are selected according to the process database 110 and the monitoring database 120. After data training, part of the process factors with time delay which significantly affect the monitoring target are picked out. The part of the process factors which significantly affect the monitoring target can be provided to the managing department 600, and the engineering department 500 can adjust those process factors accordingly.

Especially, when an exception occurs on the monitoring target, part of the process factors with time delay which significantly affect the monitoring target can be picked out and provided to the managing department 600 and the engineering department 500, such that the time for exception exclusion can reduced.

Figure 3:
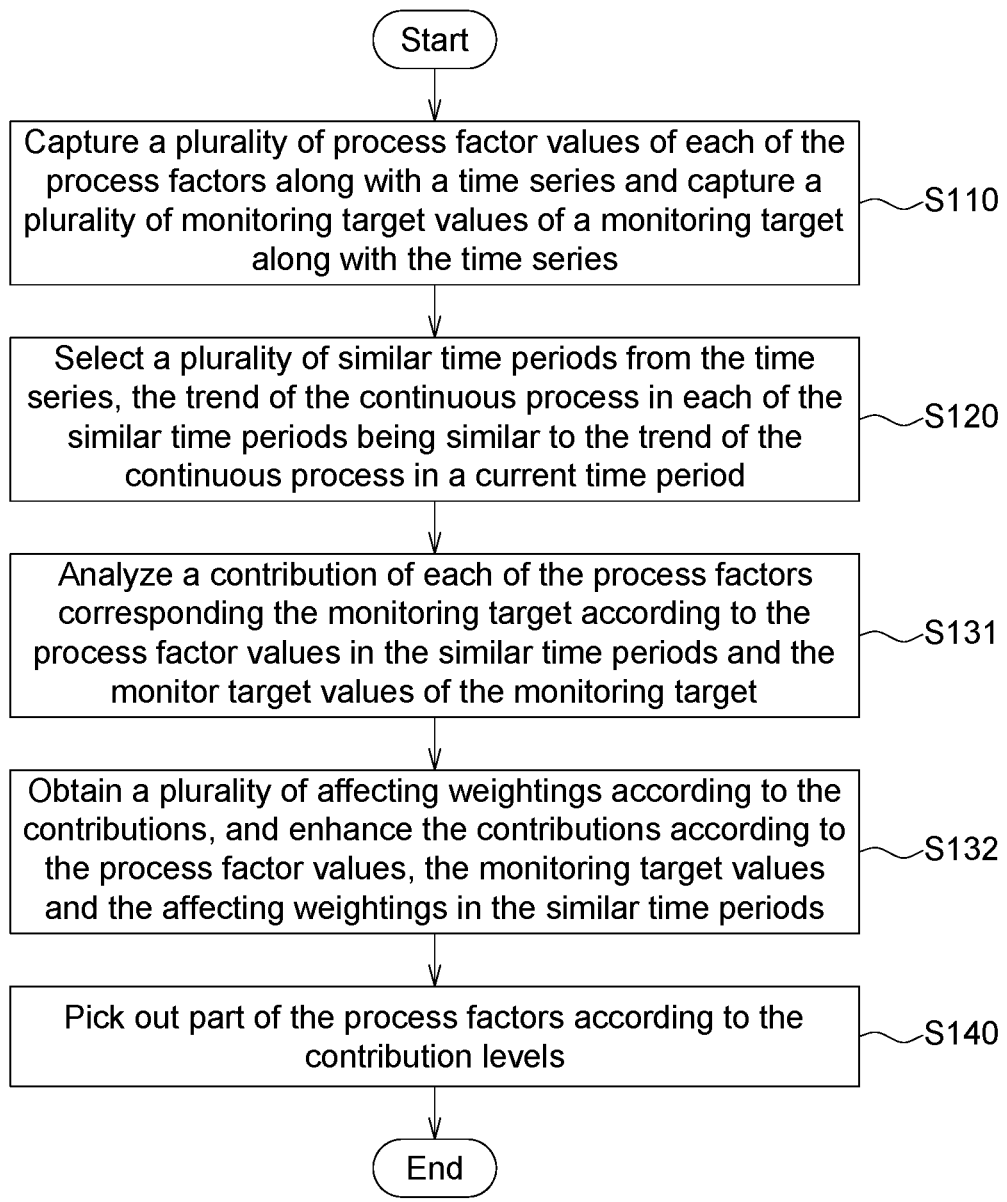
FIG. 3 shows a flowchart of a method for analyzing the process factors affecting the trend of the continuous process.

Please refer to FIG. 3, which shows a flowchart of a method for analyzing the process factors affecting the trend of the continuous process. At first, in the step S110, the capturing unit 130 captures the process factor values and the monitoring target values. Because the process factor and the monitoring target are changed along with the time series, the process factor values and the monitoring target values can be recorded with time delay. "t" is the current time. "q" is the length of the time delay window. q sets of data in the time delay window are recorded. In table 1, "$X_{1,t}$" and "$X_{2,t}$" (t=0-8) are the process factor values of two process factors. "$Y_t$" (t=0-8) are the monitoring target values of the monitoring target.

TABLE 1

| t | $Y_t$ | $X_{1,t}$ | $X_{2,t}$ |
|---|---|---|---|
| 0 | $Y_0$ | $X_{1,0}$ | $X_{2,0}$ |
| 1 | $Y_1$ | $X_{1,1}$ | $X_{2,1}$ |
| 2 | $Y_2$ | $X_{1,2}$ | $X_{2,2}$ |
| 3 | $Y_3$ | $X_{1,3}$ | $X_{2,3}$ |
| 4 | $Y_4$ | $X_{1,4}$ | $X_{2,4}$ |
| 5 | $Y_5$ | $X_{1,5}$ | $X_{2,5}$ |
| 6 | $Y_6$ | $X_{1,6}$ | $X_{2,6}$ |
| 7 | $Y_7$ | $X_{1,7}$ | $X_{2,7}$ |
| 8 | $Y_8$ | $X_{1,8}$ | $X_{2,8}$ |

Table 2 illustrates the data in the time delay window whose length is 2 (q=2). In this time delay window, time delay is "0", "1" or "2." The data in the fourth row (t=2) of the table 1 is converted with time delay and recorded in the second row ($Y_t=Y_2$) of table 2. While considering the time delay, the number of the dimensions is increased. The number of the dimensions of the two process factors with the time delay "0", "1" and "2" is increased to be 6. In a similar manner, the capturing unit 130 captures the process factor values and the monitoring target values along with the time series in the step S110.

TABLE 2

| $Y_t$ | $X_{1,t}$ | $X_{1,t-1}$ | $X_{1,t-2}$ | $X_{2,t}$ | $X_{2,t-1}$ | $X_{2,t-2}$ |
|---|---|---|---|---|---|---|
| $Y_2$ | $X_{1,2}$ | $X_{1,1}$ | $X_{1,0}$ | $X_{2,2}$ | $X_{2,1}$ | $X_{2,0}$ |
| $Y_3$ | $X_{1,3}$ | $X_{1,2}$ | $X_{1,1}$ | $X_{2,3}$ | $X_{2,2}$ | $X_{2,1}$ |
| $Y_4$ | $X_{1,4}$ | $X_{1,3}$ | $X_{1,2}$ | $X_{2,4}$ | $X_{2,3}$ | $X_{2,2}$ |
| $Y_5$ | $X_{1,5}$ | $X_{1,4}$ | $X_{1,3}$ | $X_{2,5}$ | $X_{2,4}$ | $X_{2,3}$ |
| $Y_6$ | $X_{1,6}$ | $X_{1,5}$ | $X_{1,4}$ | $X_{2,6}$ | $X_{2,5}$ | $X_{2,4}$ |
| $Y_7$ | $X_{1,7}$ | $X_{1,6}$ | $X_{1,5}$ | $X_{2,7}$ | $X_{2,6}$ | $X_{2,5}$ |
| $Y_8$ | $X_{1,8}$ | $X_{1,7}$ | $X_{1,6}$ | $X_{2,8}$ | $X_{2,7}$ | $X_{2,6}$ |

Next, in the step S120, the selecting unit 140 performs the local modeling.

Figure 4:
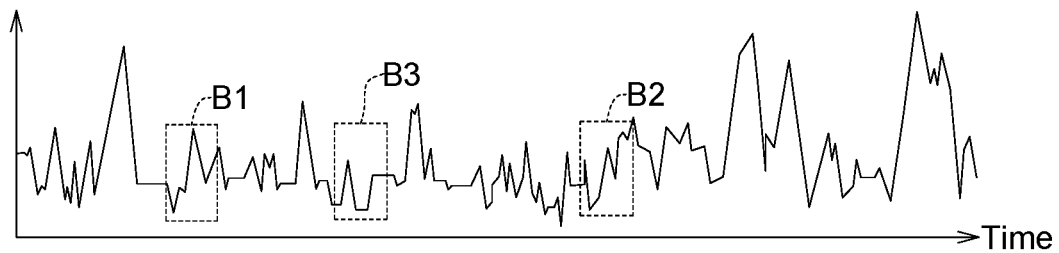
FIG. 4 shows a continuous process data.

In the continuous process plant, different process may be performed at different time. If all of the data are collected for training a global model, the analyzing performance may be a major issue. When occupancy ratio of the noise is more than a predetermined value, the global model is inaccurate. Moreover, a comprehensive solution obtained from the global model may be hard to be used for different plants and/or operation modes. Please refer to FIG. 4, which shows a continuous process data. The data in the block B1 and the data in the block B2 are similar. If the data in the block B3 is also inputted for training the model, this model will be affected by the data in the block B3, and the analyzing performance will be reduced.

Figure 5:
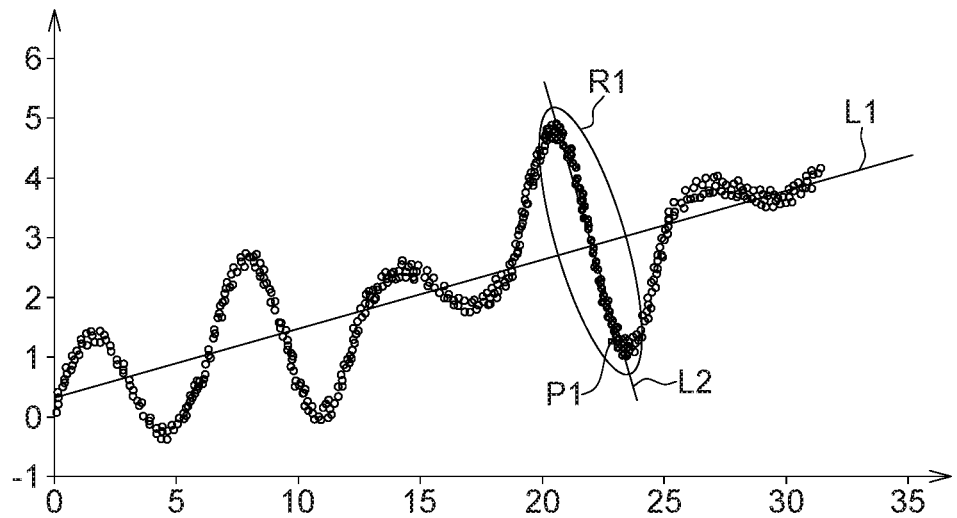
FIG. 5 shows an exemplary example of the training data.

In the present embodiment, some blocks whose trends are similar are obtained, and then the model is trained accordingly. Please refer to FIG. 5, which shows an exemplary example of the training data. Each of the points represents one training data. If the global modeling technology is used, a regression line L1 is obtained; if the local modeling technology is used, then the points in the range R1 are trained to obtained a regression line L2, which is more closer to the actual data point P1.

In the present embodiment, the dissimilarity between each historical time period and the current time period is analyzed. The dissimilarities are sorted, and some of the historical time periods whose dissimilarities are low are deemed as similar time periods and can be used for training. In one embodiment, the dissimilarity is calculated according to a combination of a value dissimilarity and a trend dissimilarity. For example, the value dissimilarity is an Euclidean distance, a Mahalanobis distance, or a difference of Euclidean distances. The dissimilarity can be calculated according to the equation (1):

$$D(t, p) = (1-v)\sqrt{\sum_{i=0}^{q-1}(Y_{t-i} - Y_{t-i-p})^2} + v\sqrt{\sum_{i=1}^{q-1}(YD_{t-i} - YD_{t-i-p})^2} \quad (1)$$

$D(t, p)$ is the dissimilarity between the t-th monitoring target value and the (t–p)-th monitoring target value. The length of the window is q. $Y_{t-i}$ is the (t–i)-th monitoring target value. $YD_{t-i}$ is the difference between the (t–i)-th monitoring target value and the (t–i–1)-th monitoring target value. That is to say, $YD_{t-i} = Y_{t-i} - Y_{t-i-1}$. $YD_{t-1}$ represents the trend in a short time. $YD_{t-i-p}$ is the difference between the (t–i–p)-th monitoring target value and the (t–i–p–1)-th monitoring target value. That is to say, $YD_{t-i-p} = Y_{t-i-p} - YD_{t-i-p-1}$. $YD_{t-i-p}$ represents the trend in a short time.

$$\sqrt{\sum_{i=0}^{q-1}(Y_{t-i} - Y_{t-i-p})^2}$$

is the value dissimilarity.

$$\sqrt{\sum_{i=1}^{q-1}(YD_{t-i} - YD_{t-i-p})^2}$$

is the trend dissimilarity. (1–v) and v are the mixing ratios of the value dissimilarity and the trend dissimilarity. The mixing ratio can be adjusted according the actual needs. For example, v=0.5.

In another embodiment, the dissimilarity can be calculated according the value dissimilarity only, or can be calculated according to the trend dissimilarity only.

For the continuous process having a lot of factors, the dissimilarity can be calculated according to the process factor values. This dissimilarity can be calculated according to the equation (2):

$$D(t, p) = (1-v)\sum_{i=0}^{q-1}\sqrt{\sum_{j=1}^{d}(X_{t-i,j} - Y_{t-i-p,j})^2} + v\sum_{i=1}^{q-1}\sqrt{\sum_{j=1}^{d}(XD_{t-i,j} - XD_{t-i-p,j})^2} \quad (2)$$

$D(t, p)$ is the dissimilarity between the t-th monitoring target value and the (t–p)-th monitoring target value. The length of the window is q. The number of the process factors is d. $X_{t-i}$ is the (t–i) process factor value. $XD_{t-i}$ is the difference between the (t–i) process factor value and the (t–i–1)-th process value. That is, $XD_{t-i} = X_{t-i} - X_{t-i-1}$. $XD_{t-i}$ presents the trend in a short time. $XD_{t-i-p}$ is the difference between the (t–i–p)-th process factor value and the (t–i–p–1)-th process factor value. That is $XD_{t-i-p} = X_{t-i-p} - X_{t-i-p-1}$. $XD_{t-i-p}$ represents the trend in a short time. (1–v) and v are the mixing ratios of the value dissimilarity and the trend dissimilarity. The mixing ratio can be adjusted. For example, v=0.5.

Base on above, in the S120, the selecting unit 140 can select a plurality of similar time periods from the time series. The trend of the continuous process in each of the similar time periods is similar to the trend of the continuous process in the current time period.

Then, in the step S131, the analyzing unit 151 analyzes a contribution of each of the process factors corresponding the monitoring target according to the process factor values in the similar time periods and the monitor target values of the monitoring target.

In one embodiment, in the step S131, the contributions are analyzed according to an Orthogonal Least Squares (OLS) algorithm, a ridge-regression algorithm, a Least Absolute Shrinkage and Selection Operator (LASSO) regression algorithm, or an elastic net regression algorithm.

In the step S132, a plurality of affecting weightings are obtained according to the contributions (or according to the experience), and the contributions are enhanced according to the affecting weightings. In one embodiment, the S132 can be omitted. In the step S132, the affecting weightings can be obtained according to the LASSO regression algorithm, or the elastic net regression algorithm.

In detail, the monitoring target values can be presented according the equation (3):

$$Y_t = b + \sum_{m=1}^{q_0}\beta_{0,m}Y_{t-m} + \sum_{j=1}^{p-1}\sum_{m=1}^{q_j}\beta_{j,m}X_{j,t-m} + e_t \quad (3)$$

$Y_t$ and $Y_{t-m}$ are the t-th monitor target value and the (t–m)-th monitoring target values. $X_{1,t-1}, \ldots, X_{1,t-q_1}, X_{2,t-1}, \ldots, X_{p-1,t-q_j}$ are the p–1 process factor values. The window length of the j-th process factor is $q_j$. $\beta_{j,m}$ is the contribution of the m-th process factor value of the j-th process factor corresponding the monitoring target $Y_t$. b is the intercept of the linear model. $e_t$ is the error term of the Normal distribution. $e_t \sim N(0,\sigma^2)$.

For simplifying the model, $Y_{t-m}$ can be deemed as $X_p$, and then $Y_t$ can be represented according the equation (4).

$$Y_t = b + \sum_{j=1}^{p}\sum_{m=1}^{q_j}\beta_{j,m}X_{j,t-m} + e_t \quad (4)$$

So, the predicted monitoring target value can be represented by "$\hat{Y}_t = f(X_{1,t-1}, \ldots, X_{p,t-p_j})$."

Then, referring to the equation (5), the contribution is calculated according to the elastic net regression algorithm.

$$\hat{\beta} = \arg\min_{\beta}\{\|Y - X\beta\|^2 + \varphi(\lambda, \alpha, \beta_{j,m})\} \quad (5)$$

$\phi(\lambda,\alpha,\beta)$ is the penalty term for improving the model stability. For example, $\phi(\lambda,\alpha,\beta)$ equals $$\lambda\sum_{j=1}^{p}\sum_{m=0}^{q_j}\left[(1-\alpha)\frac{1}{2}\beta_{j,m}^2 + \alpha|\beta_{j,m}|\right].$$

Figure 6:
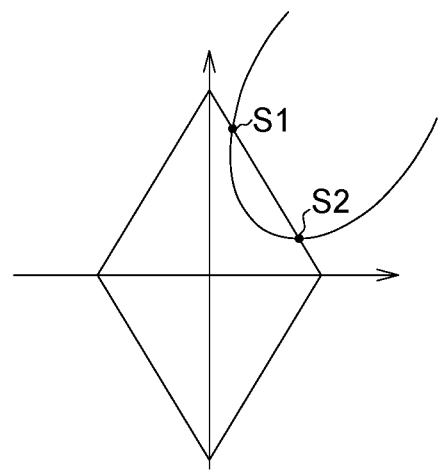
FIG. 6 illustrates an exemplary example of the step S131.

$\lambda$ is the weighting for controlling the penalty term. $\alpha$ is the parameter for controlling the penalty term. $\beta$ is the set of $\beta_{j,m}$ ($\beta=\{\beta_{j,m}\}$). In the step S131, an optimal solution is tried to found out under the limit of the cost function. However, please refer FIG. 6, which illustrates an exemplary example of the step S131. When the contribution is obtained without considering the affecting weightings, two points S1, S2 are the optimal solutions in FIG. 6.

In step S132, the affecting weighting is obtained according to the equation (6).

$$\hat{w}_{j,m} = |\hat{\beta}|^{-1} \qquad (6)$$

Figure 7:
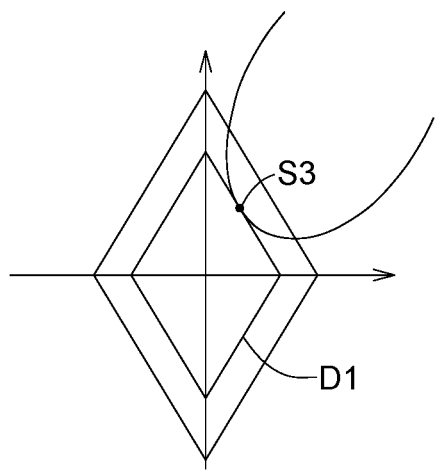
FIG. 7 illustrates an exemplary example of the step S132.

$\hat{w}_{j,m}$ is the affecting weighting. $\hat{\beta}$ is the contribution in the step S131. Please refer to FIG. 7, which illustrates an exemplary example of the step S132. Referring to the diamond D1 in FIG. 7, the affecting weighting can be used for improving the step of selecting the process factor. Based on the same cost function, the optimal solution can be converged at the point S3.

In this step, the contribution is enhanced according to the equation (7).

$$\hat{\beta}^* = \arg\min_{\beta}\{\|Y - X\beta\|^2 + \psi(\lambda, \alpha, \hat{w}_{j,m}, \beta)\} \qquad (7)$$

$\|Y-X\beta\|^2$ is a prediction model.

$$\arg\min_{\beta}\{\|Y - X\beta\|^2\}$$

is the Least square minimum error. $\psi(\lambda,\alpha,\hat{w}_{j,m},\beta)$ is the penalty term for the affecting weightings. $\psi(\lambda,\alpha,\hat{w}_{j,m},\beta)$ may be equal to $$\text{``}\lambda\sum_{j=1}^{p}\sum_{m=0}^{q_j}\left[(1-\alpha)\frac{1}{2}\beta_{j,m}^2 + \alpha\hat{w}_{j,m}|\beta_{j,m}|\right]\text{.''}$$

$\hat{\beta}^*$ is the enhanced contribution. That is to say, after the penalty term for the affecting weightings is considered in the prediction model "$\|Y-X\beta\|^2$", the Least square minimum error is calculated to obtain the enhanced contribution.

Base on above, in the step S131, the analyzing unit 151 analyzes the contribution of each of the process factors corresponding the monitoring target according to the process factor values in the similar time periods and the monitor target values of the monitoring target. In the step S132, the enhancing unit 152 obtains the affecting weightings according to the contributions, and enhances the contributions according to the process factor values, the monitoring target values and the affecting weightings in the similar time periods.

Figure 8:
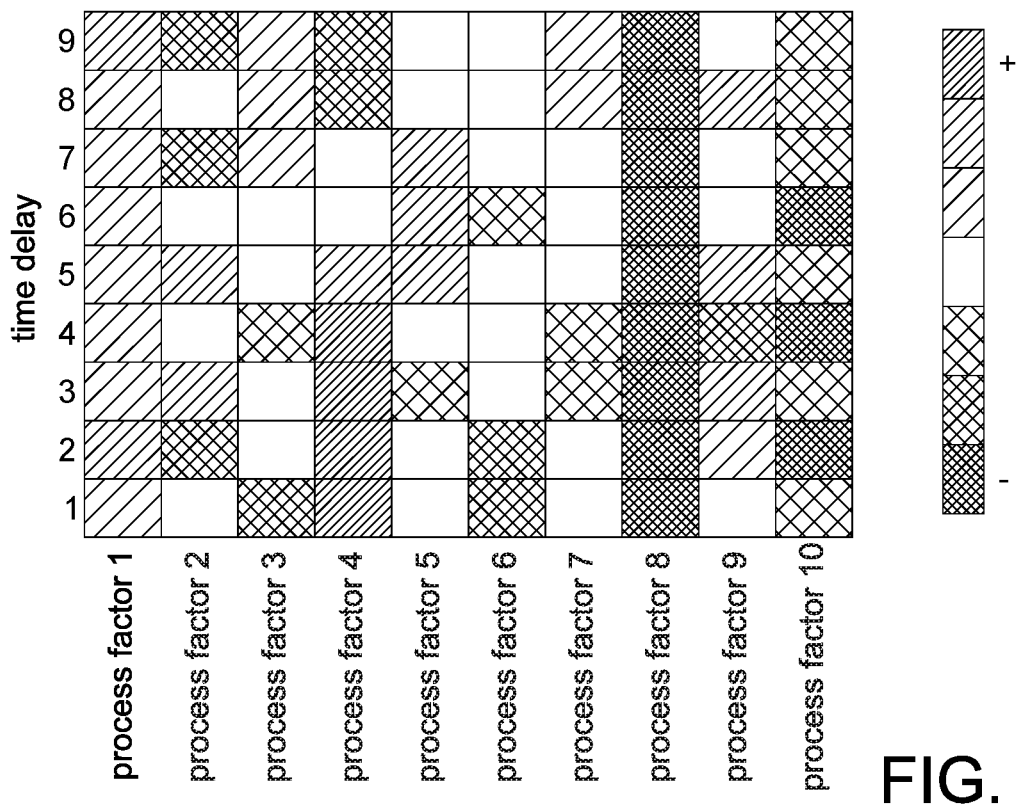
FIG. 8 illustrates an exemplary example of the result of the step S131.
Figure 9:
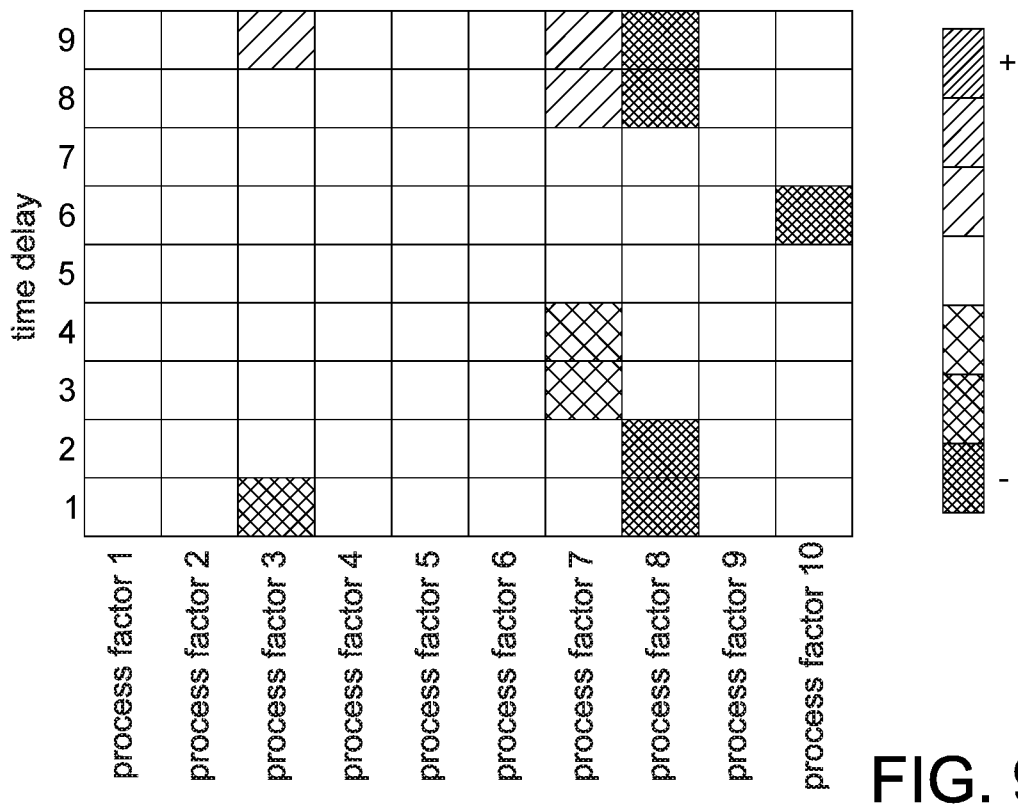
FIG. 9 illustrates an exemplary example of the result of the step S132.

Please refer FIGS. 8 and 9. FIG. 8 illustrates an exemplary example of the result of the step S131. FIG. 9 illustrates an exemplary example of the result of the step S132. In the matrix schema, the process factors are shown on the horizontal axis, and the time delay is shown on the vertical axis. The density of the slash or the cross in the matrix schema illustrates the contribution. The slash shows that the contribution is positive. The higher the density of the slash is, the higher the absolute value of the contribution is. The cross shows that the contribution is negative. The higher the density of the cross is, the higher the absolute value of the contribution is. As shown in FIG. 8 which illustrates the step S131, before considering the affecting weightings, the differences among the process factors are not clear. As shown in FIG. 9 whish illustrates the step S132, after considering the affecting weightings, the process factors which significantly affect the monitoring target are clearly shown.

Then, in step S140, the picking unit 160 calculates a relative trend varying coverage rate (RTVC rate) for picking out part of the process factors according to the contributions. For evaluating the number of the process factors affecting the monitoring target, $|\beta_{j,m}|$ is sorted to pick up the top N process factors. For example, the RTVC rate can be calculated according to the equation (8).

$$RTVC = \frac{MAPE_A}{MAPE_N} \qquad (8)$$

"RTVC" is the RTVC rate, which is used for comparing $MAPE_A$ and $MAPE_N$. $MAPE_A$ is a mean absolute percentage error (MAPE) of all of the process factors. $MAPE_N$ is the MAPE of the top N of the process factors. The MAPE ranges from 0 to 1. If the RTVC rate is close to 1, those top N process factors can be used. $MAPE_N$ can be calculated according to the equation (9).

$$MAPE_N = \frac{100}{M_A}\sum_{t=1}^{M_A}\left|\frac{A_t - F_t^N}{A_t}\right| \qquad (9)$$

$$MAPE_A = \frac{100}{M_A}\sum_{t=1}^{M_A}\left|\frac{A_t - F_t^A}{A_t}\right| \qquad (10)$$

t is time. $A_t$ is the actual monitoring target value of the time. N is the number of the top N process factors. N is a positive integer which can be predetermined or preset. $F_t^N$ is the t-th reconstructed monitoring target value using the equation (4) with top N process factor values. $F_t^A$ is the t-th reconstructed monitoring target value using the equation (4) with all process factor values. $M_A$ is the number of monitoring target values.

Figure 10:
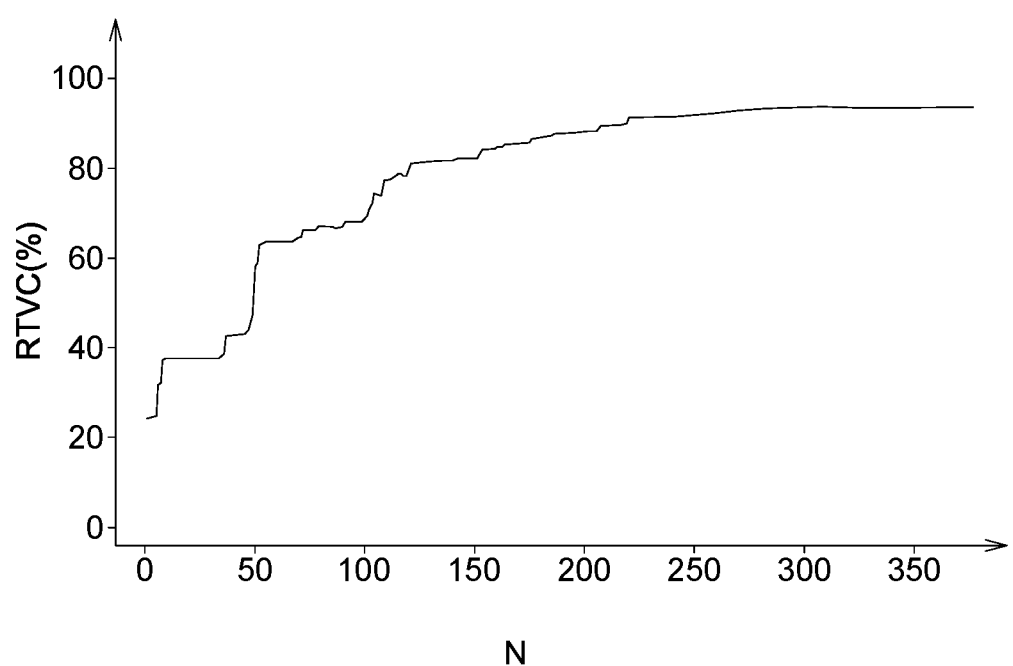
FIG. 10 shows a curve of the RTVC rate.

Please refer to FIG. 10, which shows a curve of the RTVC rate. In FIG. 10, the number of the training data is 3600, the number of the process factors is 62, and the time delay is 10. In FIG. 10, the step S131 and the step S132 are performed according the LASSO regression algorithm and the elastic net regression algorithm. In the step S132, $\alpha$=0.5. In FIG. 10, N is shown on the horizontal axis, and the RTVC rate is shown on the vertical axis. As shown in FIG. 10, if N is 130, then the RTVC rate is 80%. The picking unit 160 performs a hypothesis testing on the affecting weightings ($\beta_{j,m}$) to check whether each of the affecting weightings ($\beta_{j,m}$) is zero and obtains a plurality of P-values. The top N of the affecting weightings ($\beta_{j,m}$) are arranged according to the P-values.

Base on above, part of the process factors which significantly affect the monitoring target are picked put under an allowed forecast accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for analyzing a plurality of process factors affecting a trend of a continuous process, comprising:

capturing a plurality of process factor values of each of the process factors along with a time series and capturing a plurality of monitoring target values of a monitoring target along with the time series;

selecting a plurality of similar time periods from the time series, wherein the trend of the continuous process in each of the similar time periods is similar to the trend of the continuous process in a current time period;

analyzing a contribution of each of the process factors corresponding the monitoring target according to the process factor values in the similar time periods and the monitor target values of the monitoring target; and picking out part of the process factors according to the contributions.

2. The method for analyzing the process factors according to claim 1, wherein in the step of selecting the similar time periods, the similar time periods are selected according to a value dissimilarity or a trend dissimilarity.

3. The method for analyzing the process factors according to claim 2, wherein the value dissimilarity is calculated according to an Euclidean distance, a Mahalanobis distance, or a difference of Euclidean distances.

4. The method for analyzing the process factors according to claim 1, wherein in the step of selecting the similar time periods, the similar time periods are selected based on the monitoring target values.

5. The method for analyzing the process factors according to claim 1, wherein in the step of selecting the similar time periods, the similar time periods are selected based on the process factor values.

6. The method for analyzing the process factors according to claim 1, further comprising:

obtaining a plurality of affecting weightings according to the contributions, and enhancing the contributions according to the process factor values, the monitoring target values and the affecting weightings in the similar time periods.

7. The method for analyzing the process factors according to claim 6, wherein in the step of analyzing the contribution of each of the process factors corresponding the monitoring target, the contributions are analyzed according to an Orthogonal Least Squares (OLS) algorithm, a ridge-regression algorithm, a Least Absolute Shrinkage and Selection Operator (LASSO) regression algorithm, or an elastic net regression algorithm.

8. The method for analyzing the process factors according to claim 6, wherein in the step of filtering out part of the process factors, the part of the process factors are filtered out according to a relative trend varying coverage rate (RTVC rate).

9. The method for analyzing the process factors according to claim 8, wherein the RTVC rate is a ratio of a mean absolute percentage error (MAPE) of the part of the process factors to a MAPE of all of the process factors.

10. The method for analyzing the process factors according to claim 9, wherein in the step of picking out part of the process factors, the part of the process factors correspond to top N of the affecting weightings, and N is a positive integer.

11. The method for analyzing the process factors according to claim 10, wherein in the step of picking out part of the process factors, a hypothesis testing is performed on the affecting weightings to check whether each of the affecting weightings is zero and obtain a plurality of P-values, and the top N of the affecting weightings are arranged according to the P-values.

12. A system for analyzing a plurality of process factors affecting a trend of a continuous process, comprising:

a process database, for storing a plurality of process factor values of each of the process factors along with a time series; and a monitoring database, for storing a plurality monitoring target values of a monitoring target along with the time series; wherein the system is used for performing a method comprising:

capturing the process factor values and the monitoring target values;

selecting a plurality of similar time periods from the time series, wherein the trend of the continuous process in each of the similar time periods is similar to the trend of the continuous process in a current time period;

analyzing a contribution of each of the process factors corresponding the monitoring target according to the process factor values in the similar time periods and the monitor target values of the monitoring target; and picking out part of the process factors according to the contributions.

13. The system for analyzing the process factors according to claim 12, wherein the similar time periods are selected according to a value dissimilarity or a trend dissimilarity.

14. The system for analyzing the process factors according to claim 13, wherein the value dissimilarity is calculated according to an Euclidean distance, a Mahalanobis distance, or a difference of Euclidean distances.

15. The system for analyzing the process factors according to claim 12, wherein the similar time periods are selected based on the monitoring target values.

16. The system for analyzing the process factors according to claim 12, wherein the similar time periods are selected based on the process factor values.

17. The system for analyzing the process factors according to claim 12, wherein the method further comprises:

obtaining a plurality of affecting weightings according to the contributions, and enhancing the contributions according to the process factor values, the monitoring target values and the affecting weightings in the similar time periods.

18. The system for analyzing the process factors according to claim 17, wherein the contributions are analyzed according to an Orthogonal Least Squares (OLS) algorithm, a ridge-regression algorithm, a Least Absolute Shrinkage and Selection Operator (LASSO) regression algorithm, or an elastic net regression algorithm.

19. The system for analyzing the process factors according to claim 17, wherein the part of the process factors are filtered out according to a relative trend varying coverage rate (RTVC rate).

20. The system for analyzing the process factors according to claim 19, wherein the RTVC rate is a ratio of a mean absolute percentage error (MAPE) of the part of the process factors to an MAPE of all of the process factors.

21. The system for analyzing the process factors according to claim 20, wherein the part of the process factors correspond to top N of the affecting weightings, and N is a positive integer.

22. The system for analyzing the process factors according to claim 21, wherein a hypothesis testing is performed on the affecting weightings to check whether each of the affecting weightings is zero and obtain a plurality of P-values, and the top N of the affecting weightings are arranged according to the P-values.

* * * * *